(12) United States Patent
Favre et al.

(10) Patent No.: US 6,626,469 B2
(45) Date of Patent: Sep. 30, 2003

(54) REUSABLE COUPLING ADAPTABLE TO THE ENDS OF A FLEXIBLE REINFORCED PIPE

(75) Inventors: Patrick Favre, Mions (FR); Alain Favre, Mions (FR)

(73) Assignee: Geci, Mions (FR)

( * ) Notice: Subject to any disclaimer, the term of this patent is extended or adjusted under 35 U.S.C. 154(b) by 0 days.

(21) Appl. No.: 10/175,657

(22) Filed: Jun. 21, 2002

(65) Prior Publication Data

US 2003/0001385 A1 Jan. 2, 2003

(30) Foreign Application Priority Data

Jul. 2, 2001 (FR) ............................................. 01 08745

(51) Int. Cl.⁷ ................................................ F16L 33/00
(52) U.S. Cl. ....................... 285/249; 285/246; 285/247; 285/248
(58) Field of Search ................................ 285/246, 247, 285/249, 250, 251, 256, 259

(56) References Cited

U.S. PATENT DOCUMENTS

| | | | | |
|---|---|---|---|---|
| 2,460,653 A | * | 2/1949 | Raybould | 285/249 |
| 3,549,180 A | | 12/1970 | MacWilliam | |
| 3,606,396 A | * | 9/1971 | Prosdocimo et al. | 285/148.18 |
| 3,951,438 A | * | 4/1976 | Scales | 285/55 |
| 4,188,051 A | * | 2/1980 | Burge | 285/104 |
| 4,253,686 A | * | 3/1981 | Aitken et al. | 285/249 |
| 4,303,263 A | * | 12/1981 | Legris | 285/249 |
| 4,614,372 A | * | 9/1986 | Gschwind | 285/356 |
| 4,900,068 A | * | 2/1990 | Law | 285/139.2 |
| 5,112,087 A | * | 5/1992 | Haruki | 285/101 |
| 5,558,375 A | * | 9/1996 | Newman | 285/23 |
| 5,593,186 A | * | 1/1997 | Harris | 285/23 |

FOREIGN PATENT DOCUMENTS

| | | | | |
|---|---|---|---|---|
| DE | 42 07 436 A1 | * | 4/1993 | 285/246 |
| DE | 296 21 271 U1 | | 12/1996 | |
| FR | 1385034 | | 11/1964 | |
| FR | 2766901 | | 2/1999 | |
| GB | 2 121 133 A | * | 12/1983 | 285/249 |
| JP | 2-256993 | * | 10/1990 | 285/247 |
| WO | WO 91/00468 | | 1/1991 | |
| WO | WO 91/08414 | | 6/1991 | |
| WO | WO 00/01974 | | 1/2000 | |

* cited by examiner

Primary Examiner—Lynne H. Browne
Assistant Examiner—James M. Hewitt
(74) Attorney, Agent, or Firm—Heslin Rothenberg Farley & Mesiti P.C.; Victor A. Cardona, Esq.

(57) ABSTRACT

A reusable coupling adaptable to the ends of a tube, the coupling including a nipple (2) having a toothed end (7) designed to be inserted into the tube (1), its inside diameter corresponding approximately to the inside diameter of the tube, the nipple having an annular surface external to the tube. A peripheral ferrule (4) is mounted around the tube (1) and imprisons the tube in engagement with the toothed part (7) of the nipple (2). The ferrule (4) includes an inward annulus (5) which fits into a peripheral groove (6) on the surface of the nipple, while a seal (8) is provided within the groove to be contacted by the annulus (5). The ferrule (4) is radially compressible and is immobilized and fixed to the periphery of the tube (1) by a connection assembly made up of two connectable parts (9, 10) mounted around the end of the tube on either side of the ferrule, and which compresses the ferrule after it has been fitted on the tube.

6 Claims, 4 Drawing Sheets

FIG. 1 - PRIOR ART detail B detail A

REUSABLE COUPLING ADAPTABLE TO THE ENDS OF A FLEXIBLE REINFORCED PIPE

CROSS REFERENCE TO RELATED APPLICATION

This application claims priority from French patent application 01.08745, filed on Jul. 2, 2001, the entire disclosure of which is incorporated herein by reference.

1. Technical Field

Many areas of industry have to cope with the problem of conveying fluids in systems comprising tubular parts coupled together, whether permanently or temporarily, these parts consisting in some cases of flexible pipes or lines, usually elastomeric in nature (often silicone), which may or may not be reinforced with a textile structure such as a braid incorporated into their walls.

The present invention has to do with a novel type of reusable coupling that can make such a connection.

2. Prior Art

Generally speaking, such connections are made by inserting a nipple into the end of the tube which is then crimped by an outer ferrule so that the wall of the tube is sandwiched between the two, and the nipple provides a support for the coupling parts of the mating means mounted at the outlet or inlet of the assembly to which the pipe is to be connected.

Such an approach, which is found for example in U.S. Pat. No. 3,549,180 and FR 1 385 084, nonetheless has drawbacks in that the presence of a nipple inserted into the pipe significantly reduces the fluid pathway at this point, thus not only disturbing the movement of the fluid but possibly also, in some cases, resulting in a retention of the fluid.

The Applicant has proposed a solution in accordance with the teachings of the abovementioned documents by which this problem can be solved. This solution is illustrated in the accompanying FIG. 1 and provides almost perfect continuity of the inside wall of the tube with the inside surface of the coupling nipple.

In general terms, referring to this FIG. 1, to make the coupling of the end of the tube (1), a nipple denoted by the general reference (2) is inserted into its end. The outer portion (3) of the said nipple forms an annulus designed to support the means (J) for forming the joint with the part to which the pipe is to be coupled.

This done, a peripheral ferrule (4) is then crimped around the tube (1), thus fitted with the nipple (2), thus imprisoning the wall of the tube.

To ensure precise positioning, the ferrule (4) comprises an inward annulus (5) capable of fitting into a peripheral groove (6) on the external surface of the nipple (2) during the crimping operation.

Although such an approach makes it possible to produce couplings in which the internal pathway includes no region of fluid retention, it is not possible to guarantee that the assembly is completely aseptic, owing to the fact that mould, bacteria and the like may sometimes settle in the connection region between the nipple (2) and the end (5) of the ferrule (4).

In its patent application WO 00/01974, the Applicant proposed a solution which not only makes it possible to produce a coupling that contains no region of fluid retention but which also makes it possible to obtain a completely aseptic assembly that eliminates all risk of infiltration from the outside of bodies such as mould, bacteria and the like, which could contaminate the fluid conveyed inside the system. This solution consists, in general terms, in interposing a peripheral seal between the extreme edge of the annulus of the ferrule and that of the outer wall of the groove provided on the nipple.

Such a solution is perfectly satisfactory in the case of fixed systems, but as it involves crimping, it cannot be used to produce couplings that can be disassembled rapidly, for example if a defective pipe requires changing. Moreover, by its very design, such a coupling cannot be reused.

The solution to this problem of producing a reusable, anti-binding and aseptic coupling is to be found in the teachings of French Patent 2 766 901 by the Applicant.

Although this solution is satisfactory in the case of non-reinforced plastic pipes whose walls can be compressed relatively easily, it is unsuitable for producing couplings for the ends of pipes having thick, virtually incompressible walls containing a reinforcement.

To date, therefore, when making couplings on such thick-walled reinforced pipes, only crimped assemblies, of the type disclosed in WO 00/01974, provide mechanical characteristics that eliminate all risk of tearing, and eliminate the problems of retention and the risk of infiltration of contaminants from the outside.

SUMMARY OF THE INVENTION

In general terms, the invention therefore seeks to solve all the abovementioned problems while allowing the coupling to be assembled directly by the user in situ and the coupling component to be rapidly dismantled, as for example during a maintenance operation, whilst at the same time allowing it to be reused.

In general terms, the invention therefore relates to a reusable coupling adaptable to the ends of a tube and which comprises:

- a nipple comprising a toothed end designed to be inserted into the tube, its inside diameter corresponding approximately to the inside diameter of the tube, the said end being continued by an annular surface external to the tube, at the end of which are the actual means of connection to the part to which the tube is to be connected;
- a peripheral ferrule mounted around the tube and imprisoning the latter in engagement with the toothed part of the nipple, the said ferrule comprising an inward annulus capable of fitting into a peripheral groove on the surface of the nipple, while a seal is provided at the location of this annulus.

The coupling according to the invention is characterized in that the peripheral locking ferrule is radially compressible and is immobilized and fixed to the periphery of the tube by a "connection" assembly comprising two connectable parts mounted around the end of the tube on either side of the said locking ferrule, namely:

- a first part or "outer sleeve" positioned around the nipple and comprising on its rear face an annulus capable of bearing against one of the ends of the clamping ferrule and, on its front face, an internal cage forming a nut;
- a second part or "clamping ring" positioned around the pipe, downstream with respect to the clamping ferrule, the said ring comprising an external threaded portion that can be screwed into the threaded portion of the first part and an internal chamber capable of bearing against the peripheral surface of the ferrule, thereby crushing it and imprisoning the wall of the pipe, as well as pushing the inward annulus of the said ferrule into the peripheral groove on the surface of the said nipple, and imprisoning the seal between the said annulus and the bottom of the groove.

Materials from which the various parts of which a coupling according to the invention is composed can be made are preferably stainless steel for the nipple and the outer sleeve of the connection assembly, while the radially compressible peripheral ferrule and the clamping ring forming the second part of the connection assembly will be made in an engineering plastic.

Such a combination of materials eliminates any risk of binding during assembly and disassembly.

In a preferred embodiment, the compressible ferrule is made of plastic and comprises teeth on its internal face and along part of its length, its external surface having two oppositely tapering regions, the region facing the internal surface of the clamping ring bearing against a region of corresponding taper provided in the chamber of the said ring.

To make the said ferrule radially compressible, staggered slits are provided occupying at least part of the length of each tapering region of the compression ferrule.

BRIEF DESCRIPTION OF THE DRAWINGS

The invention and the advantages which it provides will however be understood more clearly from the illustrative embodiment given below by way of non-restrictive indication. This is illustrated in the attached drawings, in which.

DETAILED DESCRIPTION OF THE INVENTION

As indicated earlier, FIGS. 2 to 7 illustrate one embodiment of a reusable coupling in accordance with the invention.

Figure 1:
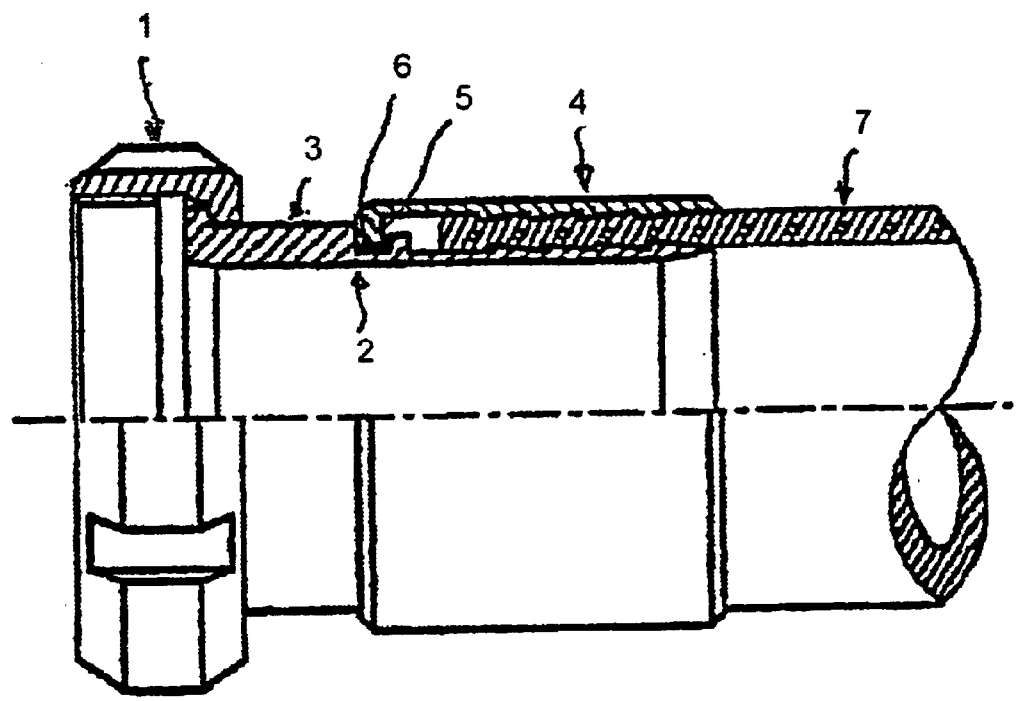
FIG. 1 illustrates the state of the art reviewed in the preamble to this application.

In the remainder of the description, the same references as were used for the prior art illustrated in FIG. 1 will be used to denote the same parts used in the invention.

Figure 2:
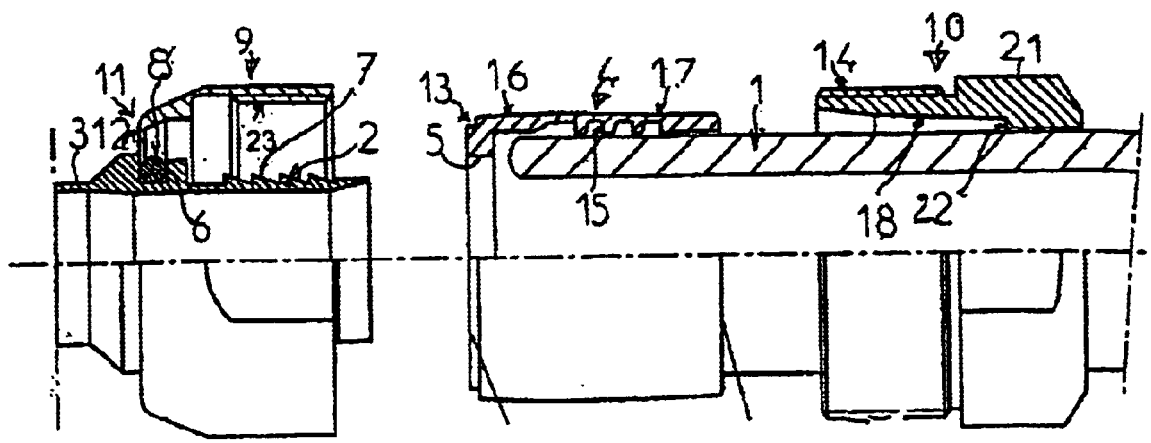
FIGS. 2 and 3 are half-sectional side views illustrating the fitting of a coupling according to the invention before the clamping ferrule is locked (FIG. 2), and after it is clamped (FIG. 3)
Figure 3:
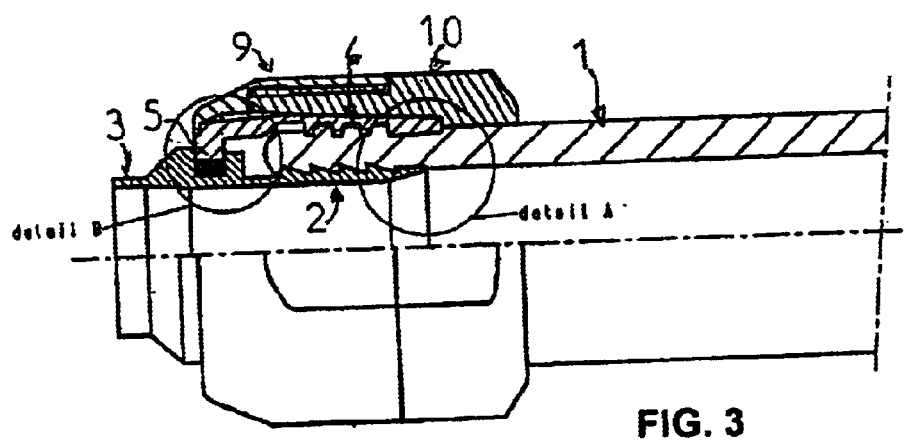
Figure 4:
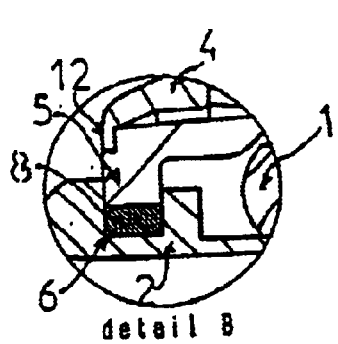
FIGS. 4 and 5 are enlarged views of the areas circled in FIGS. 2 and 3 showing more precisely how the locking of the peripheral seal and the wall of the tube takes place.
Figure 5:
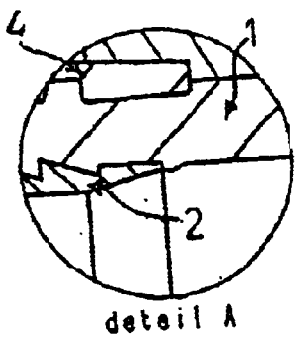
Figure 6:
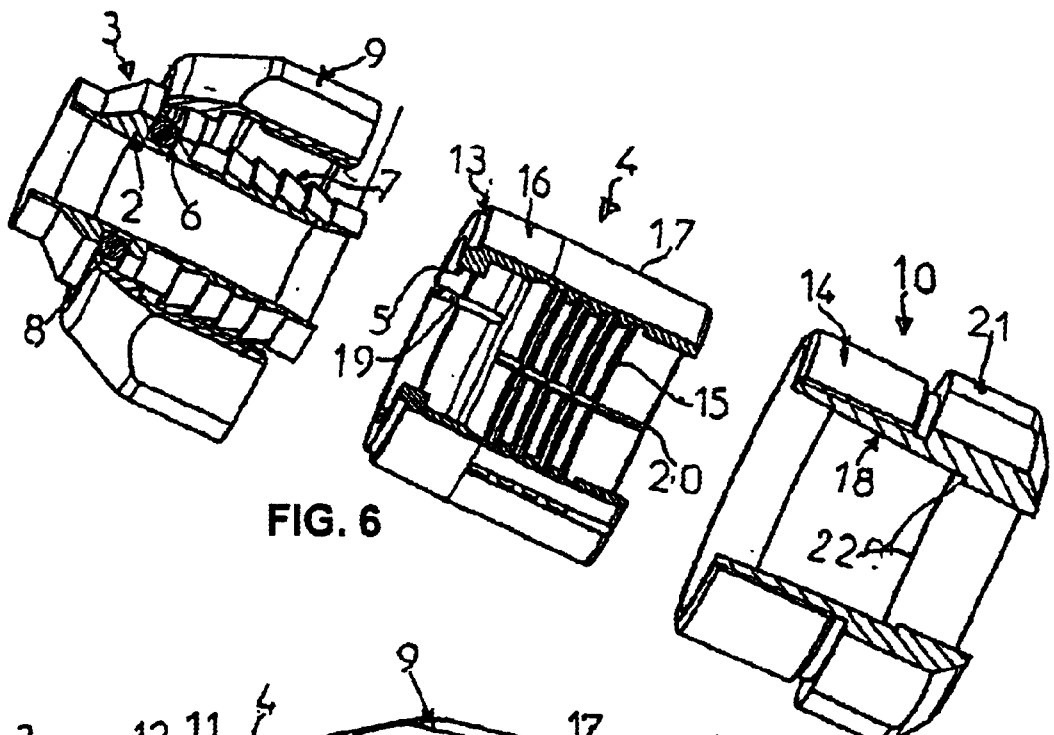
FIGS. 6 and 7 are exploded perspective views showing the various components of a coupling made in accordance with the invention before it is fitted around the end of the tube (FIG. 6) and after it is fitted to this tube (FIG. 7), the end of the said tube not being shown in these figures for easier understanding.

Additionally, it should be observed that FIGS. 2, 3 and 6 are drawn at full scale and illustrate an example of an embodiment for a coupling situated at the end of a flexible tube (1) having an inside diameter of 25 mm and a wall thickness of 6 mm.

Figure 7:
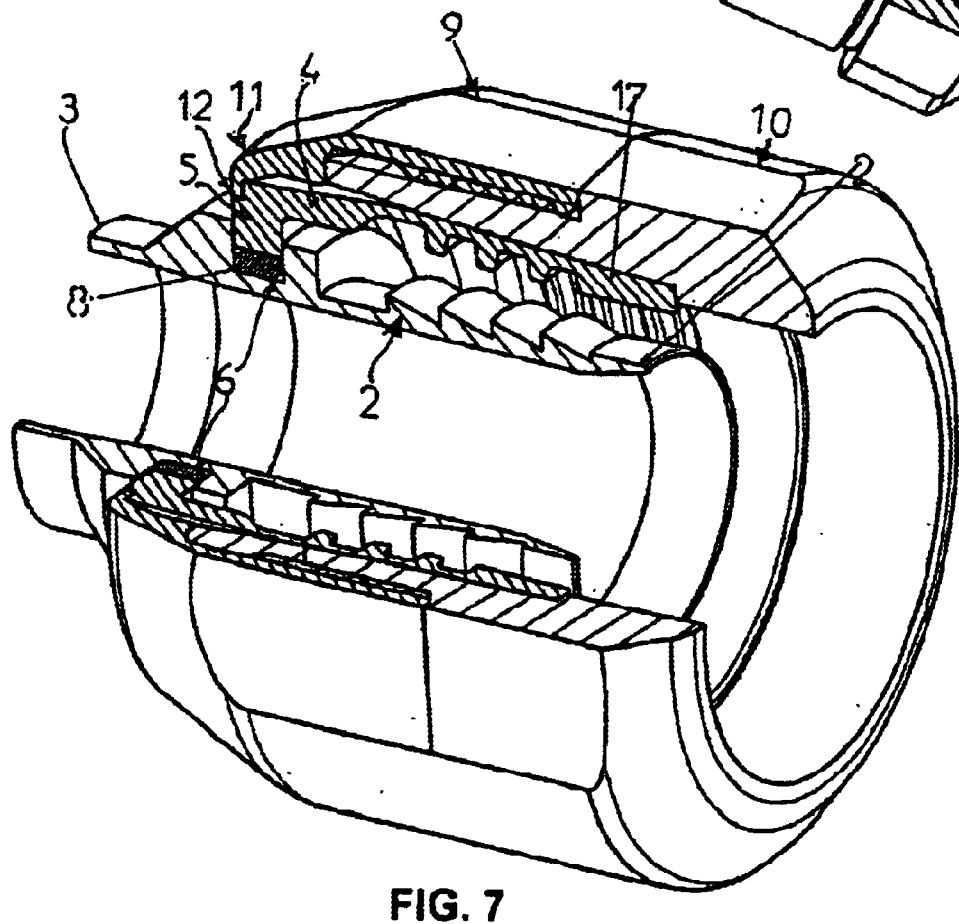

FIG. 7 meanwhile is an exploded view of the structure of a coupling after assembly around the pipe, shown at a scale of 2:1, the said pipe being omitted for clarity.

It will be obvious that the invention can be used on a wide range of tubes with inside diameters which can vary from a few millimeters to a 100 mm or more, and with wall thicknesses which may be greater than or approximately 8 mm.

Referring to the attached diagrams, the novel coupling in accordance with the invention, designed to be fitted to the end of a flexible, preferably reinforced pipe denoted by the general reference (1), is therefore composed of a nipple, denoted by the general reference (2), the exterior part of which forms an annulus (3) designed to support joining means (not shown in the figures) for attachment to the part to which the tube (1) is to be coupled. This nipple (2) is therefore designed to be inserted into the tube (1) and comprises, along its length designed to be inserted into the said tube, a succession of teeth (7) the peripheral envelope of which has a diameter slightly greater than the diameter of the said tube (1).

Between this toothed region (7) and the annulus (3) supporting the actual coupling means, the nipple comprises a groove (6) capable of accomodating a seal (8) and the inward annulus (5) provided at the end of the peripheral ferrule denoted by the reference (4).

Such a nipple (2) therefore has a general structure of the type known from the prior art as illustrated in FIG. 1.

Just as in the prior art, the nipple (2) is held in position inside the tube by a peripheral ferrule (4), which is fitted around the tube (1) and imprisons it in conjunction with the toothed part (7) of the nipple.

This ferrule (4) also includes at one end an inward annulus (5) capable of fitting into the peripheral groove (6) on the surface of the nipple (2), a seal (8) being provided at the location of this annulus, inside the groove.

In accordance with the invention, in order that the ferrule is held and locked in position, the latter has a structure such as to be radially compressible. For this purpose it is immobilized and fixed around the periphery of the tube by means of a "connection" assembly comprising two connectable parts, denoted respectively by the general references (9) and (10): these are fitted around the end of the tube (1) on either side of the locking ferrule (4).

The first part (9), or "outer sleeve", is therefore arranged around the front of the nipple and comprises, on its rear face (11), an open annulus (12) directed towards the longitudinal axis of the assembly. This annulus is capable of bearing against a peripheral groove (13) on the front face of the clamping ferrule (4). The diameter of the annulus (12) is such as to allow the nipple to pass freely through it. In addition the sleeve (9) has an internal cage (23) forming a nut on its front face.

The second part of the connection assembly consists of a ring (10) or "clamping ring". This ring (10) is positioned around the pipe (1), downstream with respect to the clamping ferrule (4). It has a threaded external portion (14) that can be screwed into the threaded portion (13) of the first part (9).

In a preferred embodiment, the nipple and the outer sleeve (9) are made of stainless steel, while the compressible ferrule (4) and the clamping ring (10) are made in an engineering plastic, thereby eliminating all risk of binding during assembly and disassembly.

In the embodiment illustrated, the compressible ferrule (4) is therefore made of a plastic. It has teeth (15) on its internal face. Its external surface comprises two oppositely tapering regions (16) and (17). The rear tapering region (17)

is intended to be brought up against a corresponding tapering region (18) on the inside of the clamping ring (10).

In the embodiment illustrated, in order to make the ferrule (4) compressible, staggered radial slits are provided, occupying at least part of the length of each tapering region (16, 17) of the compression ferrule (4).

As an example, the region (16) comprises four slits (19) having a width of 2 mm and a length of 10 mm, and being staggered at angles of 90° with respect to each other.

The region (17) comprises six slits (20) staggered at angles of 60° with respect to each other. These slits also have a width of 2 mm and a length of 25 mm. These slits (20) are staggered axially with respect to the slits (19).

Lastly, the clamping ring (10) comprises means to facilitate the screwing together of the two parts (9, 10). For this purpose, the end (21) of the said ring may include flats on its outer face for use with a spanner.

Figure 8:
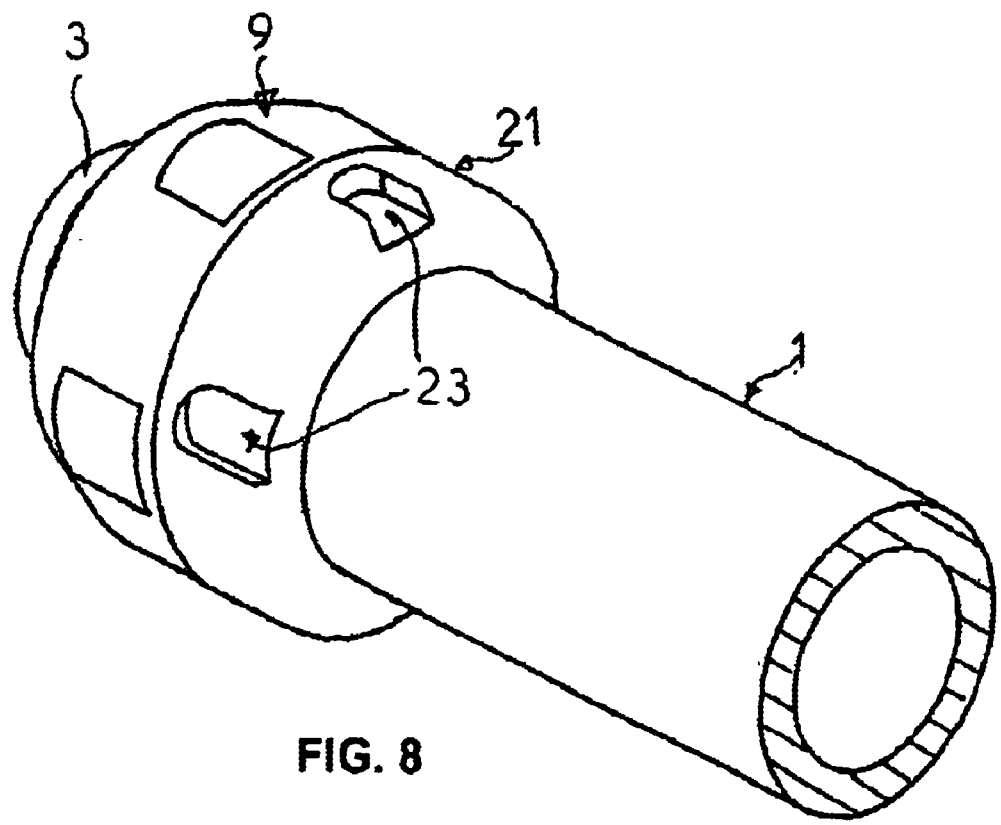
FIG. 8 is a perspective view showing a variant of a coupling in accordance with the invention once mounted on the end of tube.

Advantageously, as it can be seen in the embodiment illustrated in FIG. 8, instead of providing flat faces on the clamping head (21), it is conceivable to provide a number of grooves (23), in which case the coupling would be tightened up using a tool having claws which would fit into these recesses.

The procedure for using the device in accordance with the invention will now be explained.

The first phase is to place the clamping ring (10) around the tube (1), where it can slide freely along it. The compressible ferrule (4) according to the invention is then also positioned around the end of the tube (1).

The sleeve (9) is then placed around the end of the tube and covers the ferrule. This done, the nipple (2) is forced in, so that the end of the tube (1) bears against the teeth (7) of the nipple and is positioned close to the wall defining the peripheral groove (6) in which a seal (8) is positioned.

In order to lock and immobilize the assembly around the end of the tube, it is now a simple matter of using a spanner to screw the clamping ring (10) into the threaded portion (13) of the outer sleeve (9). During this operation, the tapering surface (18) of the ring (10) therefore presses against the corresponding tapering surface (17) of the ferrule, causing the toothed arms of this ferrule to bend and compress. When it can be screwed no further, the tapering region (16) of the ferrule bears against a slope on the inside of the sleeve (9), causing this region (16) of the ferrule to bend in and pushing the inward annulus (5) on the end of the ferrule into the groove (6) located on the nipple, in which the peripheral seal has already been placed.

Once the whole is fully assembled, the tube is rigidly held between the clamping ferrule (4) and the nipple (2).

Also, since the ferrule (4) is imprisoned between the peripheral shoulder (12) and the rear wall (22) formed by the inward shoulder of the ring (21), there is a dual locking action that eliminates any risk of the tube being pulled out and gives the assembly mechanical characteristics that are at least equivalent, if not superior to, assemblies made previously by crimping, whilst at the same time allowing for the possibility of easily dismantling the said assembly should work need to be carried out.

What is claimed is:

1. Reusable coupling adaptable to the ends of a tube, comprising:

a nipple (2) comprising a toothed end (7) designed to be inserted into the tube, an inside diameter of said nipple corresponding approximately to the inside diameter of the tube, said nipple further comprising an annular surface (3) external to the tube and a peripheral groove (6) at a second end of said nipple;

a peripheral ferrule (4) mounted around the tube (1) and imprisoning the tube in engagement with the toothed part (7) of the nipple (2), said ferrule (4) comprising an inward annulus (5) capable of fitting into the peripheral groove (6) on the surface of the nipple, while a seal (8) is provided at the location of said annulus, wherein the peripheral ferrule (4) is radially compressible and is immobilized and fixed to the periphery of the tube (1) by a connection assembly comprising two connectable parts (9, 10) mounted around the end of the tube (1) on either side of said ferrule (4), and said assembly comprising:

a first part defining an outer sleeve (9) positioned around the nipple and comprising on its rear face an annulus for bearing against one of the ends of the ferrule (4) and, on its front face, an internal cage forming a nut (13);

a second part defining a clamping ring (10) positioned around the pipe (1), downstream with respect to the ferrule (4), said second part comprising an external threaded portion (14) that can be screwed into a threaded portion of the first part (9) and an internal chamber (18) for bearing against the peripheral surface (17) of the ferrule (4), thereby crushing it and imprisoning the tube (1), as well as pushing the inward annulus (5) of said ferrule (4) into the peripheral groove (6) on the surface of the nipple (2), and imprisoning the seal (8) between said annulus and the bottom of the groove.

2. Coupling according to claim 1, characterized in that the compressible ferrule (4) is made of plastic and comprises teeth (15) on its internal face and along part of its length, its external surface having two oppositely tapering regions (16, 17), the region (17) facing the internal surface of the clamping ring (10) bearing against a region of corresponding taper provided in the chamber of the said ring.

3. Coupling according to claim 1, characterized in that the ferrule (4) comprises staggered slits (19, 20) occupying at least part of the length of each tapering region (16, 17) of the compressible ferrule (4).

4. Coupling according to claim 1, wherein the nipple (2) and the outer sleeve (9) of the connection assembly are made of stainless steel, while the clamping ring (10) and the peripheral ferrule (4) are made of an engineering plastic.

5. Coupling according to claim 2, wherein the nipple (2) and the outer sleeve (9) of the connection assembly are made of stainless steel, while the clamping ring (10) and the peripheral ferrule (4) are made of an engineering plastic.

6. Coupling according to claim 3, wherein the nipple (2) and the outer sleeve (9) of the connection assembly are made of stainless steel, while the clamping ring (10) and the peripheral ferrule (4) are made of an engineering plastic.

* * * * *